United States Patent
Sandven et al.

(10) Patent No.: US 7,424,565 B2
(45) Date of Patent: Sep. 9, 2008

(54) METHOD AND APPARATUS FOR PROVIDING EFFICIENT OUTPUT BUFFERING AND BUS SPEED MATCHING

(75) Inventors: Magne Vigulf Sandven, Ski (NO); Morten Schanke, Oslo (NO); Brian Edward Manula, Oslo (NO)

(73) Assignee: Sun Microsystems, Inc., Santa Clara, CA (US)

( * ) Notice: Subject to any disclaimer, the term of this patent is extended or adjusted under 35 U.S.C. 154(b) by 116 days.

(21) Appl. No.: 11/280,148

(22) Filed: Nov. 16, 2005

(65) Prior Publication Data

US 2007/0112994 A1 May 17, 2007

(51) Int. Cl.
*G06F 13/36* (2006.01)
(52) U.S. Cl. .................................. 710/310; 710/57
(58) Field of Classification Search ......... 710/309–317, 710/52, 58–61, 29–35; 711/147, 150, 168, 711/170, 166
See application file for complete search history.

(56) References Cited

U.S. PATENT DOCUMENTS

| | | | | |
|---|---|---|---|---|
| 5,802,055 A | * | 9/1998 | Krein et al. | 370/402 |
| 6,243,781 B1 | * | 6/2001 | Gandhi et al. | 710/313 |
| 6,820,091 B2 | * | 11/2004 | Weigelt | 707/102 |
| 6,862,673 B2 | * | 3/2005 | Lee et al. | 711/169 |
| 6,931,472 B1 | * | 8/2005 | Kondo et al. | 710/310 |
| 7,191,255 B2 | * | 3/2007 | Wong et al. | 710/5 |
| 2002/0138790 A1 | * | 9/2002 | Nishtala | 714/43 |
| 2004/0019729 A1 | * | 1/2004 | Kelley et al. | 710/306 |
| 2005/0125590 A1 | * | 6/2005 | Li et al. | 710/317 |

* cited by examiner

*Primary Examiner*—Raymond N Phan
(74) *Attorney, Agent, or Firm*—Park, Vaughan & Fleming LLP

(57) ABSTRACT

An interconnect apparatus includes a transaction packet buffer and control logic. The control logic can be operable sequentially to write transaction packets for transmission to the transaction packet buffer and to transmit the buffered transaction packets in sequence to a destination. The control logic can further be operable on receipt of a control packet indicative of non-receipt by the destination of a transmitted transaction packet to retransmit the non-received transaction packet and transaction packets transmitted from the transaction packet buffer subsequent to the non-received transaction packet.

12 Claims, 10 Drawing Sheets

| Bits 31 ... 0 | Byte Offset (Hex) |
|---|---|
| Device ID \| Vendor ID | 00 |
| Status \| Command | 04 |
| Class Code \| Revision ID | 08 |
| BIST \| Header Type \| Master Latency Timer \| Cache Line Size | 0C |
| Base Address Register 0 | 10 |
| Base Address Register 1 | 14 |
| Secondary Latency Timer \| Subordinate Bus Number \| Secondary Bus Timer \| Primary Bus Timer | 18 |
| Secondary Status \| I/O Limit \| I/O Base | 1C |
| Memory Limit \| Memory Base | 20 |
| Prefetchable Memory Limit \| Prefetchable Memory Base | 24 |
| Prefetchable Base Upper 32 Bits | 28 |
| Prefetchable Base Lower 32 Bits | 2C |
| I/O Limit Upper 16 Bits \| I/O Limit Lower 16 Bits | 30 |
| Reserved \| Capabilites Pointer | 34 |
| Expansion ROM Base Address | 38 |
| Bridge Control \| Interrupt Pin \| Interrupt Line | 3C |

Fig. 6

| Byte Offset (Hex) | | |
|---|---|---|
| 31 | 0 | |
| Device ID | Vendor ID | 00 |
| Status | Command | 04 |
| Class Code | Revision ID | 08 |
| BIST | Header Type | Master Latency Timer | Cache Line Size | 0C |

| 31 | | | 0 | |
|---|---|---|---|---|
| Device ID | | Vendor ID | | 00 |
| Status | | Command | | 04 |
| Class Code | | | Revision ID | 08 |
| BIST | Header Type | Master Latency Timer | Cache Line Size | 0C |
| Base Address Registers | | | | 10 |
| | | | | 14 |
| | | | | 18 |
| | | | | 1C |
| | | | | 20 |
| | | | | 24 |
| Cardbus CIS Pointer | | | | 28 |
| Subsystem ID | | Subsystem Vendor ID | | 2C |
| Expansion ROM Base Address | | | | 30 |
| Reserved | | | Capabilites Pointer | 34 |
| Reserved | | | | 38 |
| Max_Lat | Min_Gnt | Interrupt Pin | Interrupt Line | 3C |

Fig. 7

METHOD AND APPARATUS FOR PROVIDING EFFICIENT OUTPUT BUFFERING AND BUS SPEED MATCHING

RELATED APPLICATIONS

This application is related to U.S. patent application Ser. Nos. 11/280,155, entitled "Apparatus and Method for Implementing a Communications Port" (SUN05-0508), 11/280,152, entitled "Dynamic Buffer Space Allocation" (SUN05-0819) and 11/280,154, entitled "Dynamic Retry Buffer" (SUN05-0820), all of which were filed Nov. 16, 2005.

BACKGROUND

The present invention relates to communication apparatus and in particular, but not exclusively, to a PCI Express interconnect apparatus.

In many computer environments, a fast and flexible interconnect system can be desirable to provide connectivity to devices capable of high levels of data throughput. In the fields of data transfer between devices in a computing environment, PCI Express (PCI-E) can be used to provide connectivity between a host and one or more client devices or endpoints. PCI Express is becoming a de-facto I/O interconnect for servers and desktop computers. PCI Express allows physical system decoupling (CPU <-> I/O) through high-speed serial I/O. The PCI Express Base Specification 1.0 sets out behavior requirements of devices using the PCI Express interconnect standard. According to the Specification, PCI Express is a host to endpoint protocol where each endpoint connects to a host and is accessible by the host. PCI Express imposes a stringent tree structure relationship between I/O Devices and a Root Complex.

In an interconnect system, different buses may have different bus speeds. The present invention seeks to facilitate speed matching.

SUMMARY OF THE INVENTION

The present invention has been made, at least in part, in consideration of problems and drawbacks of conventional systems.

An aspect of the invention provides an interconnect apparatus comprising a transaction packet buffer. Control logic is operable sequentially to write transaction packets for transmission to the transaction packet buffer and is operable to transmit the buffered transaction packets in sequence to a destination. The control logic is further operable, on receipt of a control packet indicative of non-receipt by the destination of a transmitted transaction packet, to retransmit the non-received transaction packet and transaction packets transmitted from the transaction packet buffer subsequent to the non-received transaction packet.

An example embodiment of the invention can combine the functions of an output buffer and a retry buffer to provide efficient output buffering and bus speed matching.

The control logic can be operable to identify transaction packets in the transaction packet buffer that have been transmitted and transaction packets yet to be transmitted. In one example embodiment, the control logic includes an address buffer with entries in the address buffer identifying locations in the transaction packet buffer at which a corresponding transaction packet is stored. A read pointer can indicate an address buffer entry for a next transaction packet to be transmitted and a write pointer can indicate an address buffer entry for a next transaction packet to be added to the buffer. A last acknowledged sequence number pointer can indicate an address buffer entry for the transaction packet having a sequence number for which an acknowledgment of receipt from the packet destination was last received.

Another aspect of the invention provides a method of providing output buffering and speed matching for an interconnect apparatus. The method includes writing sequentially transaction layer packets for transmission to a transaction layer packet buffer and transmitting the buffered transaction packets in sequence to a destination. The method further includes, on receipt of a control packet indicative of non-receipt by the destination of a transmitted transaction layer packet, retransmitting the non-received transaction packet and transaction layer packets transmitted from the transaction layer packet buffer subsequent to the non-received transaction packet.

Although various aspects of the invention are set out in the accompanying independent claims, other aspects of the invention include any combination of features from the described embodiments and/or the accompanying dependent claims, and not solely the combinations set out in the accompanying claims.

BRIEF DESCRIPTION OF THE FIGURES

Specific embodiments of the present invention will now be described by way of example only with reference to the accompanying Figures in which:

FIG. 6 is a schematic structure overview for a Type 1 configuration header;

FIG. 7 is a schematic structure overview for a Type 0 configuration header;

Figure 1:
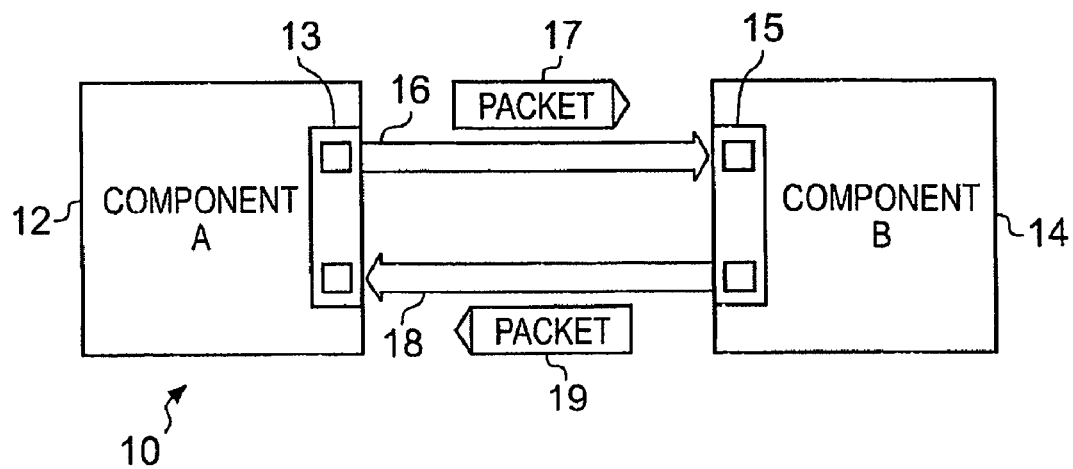
FIG. 1 is a schematic representation of a PCI Express connection.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF PARTICULAR EMBODIMENTS

Embodiments of the invention are described in the following with reference to an example of an interconnect apparatus for supporting PCI Express.

The PCI Express 1.0 standard set out in the PCI Express Base Specification 1.0 available from the PCI (Peripheral Component Interconnect) Special Interest Group (www.pcisig.com) is one example of a computer interconnect standard. The PCI Express architecture is a high performance, general purpose I/O interconnect defined for a wide variety of existing and future computing and communication platforms. Key attributes from the original PCI architecture, such as its usage model, load-store architecture, and software interfaces, are maintained. On the other hand, the parallel bus implementation of PCI is replaced in PCI Express by a highly scalable, fully serial interface. Among the advanced features supported by PCI Express are power management, Quality of Service (QoS), hot-plug/hot-swap support, data integrity, and error handling. PCI Express is also backwards compatible with the software models used to describe PCI, such that PCI Express hardware can be detected and configured using PCI system configuration software implementations with no modifications.

With reference to FIG. 1, there will now be described the basic point-to-point communications channel provided by PCI Express. A component collection consisting of two ports and the lanes connecting those ports can be referred to as a link. A link represents a dual-simplex communications channel between two components. As shown in FIG. 1, in its simplest form, a link 10 includes two components 12 and 14, each including a respective transmit and receive port pair 13 and 15. Two uni-directional, low-voltage, differentially driven channels 16 and 18 connect the ports of the components, one channel in each direction. The channel pair can be referred to as a lane. The channels 16 and 18 each carry packets 17 and 19 between the components. According to the PCI Express 1.0 specification, each lane provides an effective data transfer rate of 2.5 Gigabits/second/lane/direction. For circumstances where this data bandwidth is insufficient, to scale bandwidth, a link may aggregate multiple lanes denoted by xN where N may be any of the supported link widths. An ×8 link represents an aggregate bandwidth of 20 Gigabits/second of raw bandwidth in each direction. This base specification 1.0 describes operations for ×1, ×2, ×4, ×8, ×12, ×16, and ×32 lane widths. According to the specification only symmetrical links are permitted, such that a link includes the same number of lanes in each direction.

Figure 2:
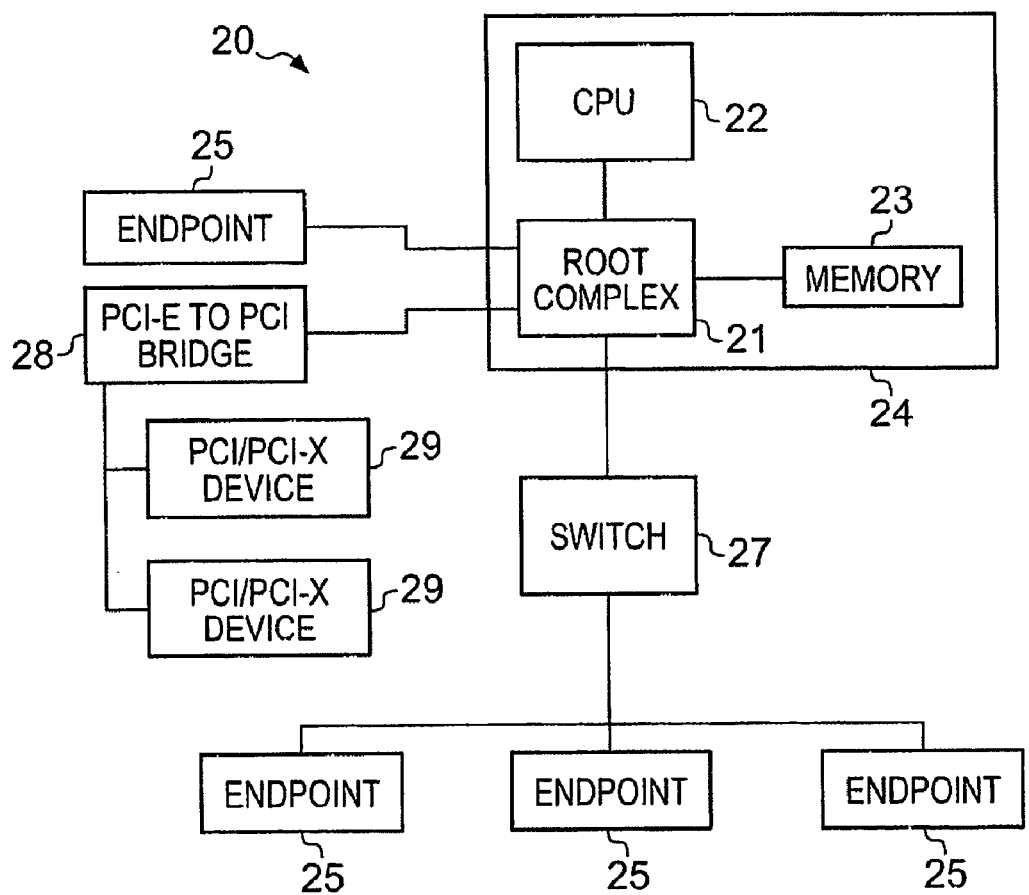
FIG. 2 is a schematic representation of an example of a PCI Express fabric topology.

With reference to FIG. 2, there will now be described an example of a PCI Express fabric topology 20. A fabric is composed of point-to-point links that interconnect a set of components. In the example of FIG. 2, there is shown a single fabric instance 20 referred to as a hierarchy, composed of a root complex 21, multiple endpoints 25 (such as I/O devices), a switch 27, and a PCI Express to PCI Bridge 28, all interconnected via PCI Express links. The root complex 21 can be connected to a CPU 22 and memory 23 subsystem which requires access to the I/O facilitated by the PCI Express fabric. The combination of root complex, CPU and memory can be referred to as a host 24. Each of the components of the topology is mapped in a single flat address space and can be accessed using PCI-like load/store accesses transaction semantics.

A root complex 21 is the root of an I/O hierarchy that connects the CPU/memory subsystem to the I/O. As illustrated in FIG. 2, a root complex 21 may support one or more PCI Express ports. Each interface defines a separate hierarchy domain. Each hierarchy domain may be composed of a single endpoint or a sub-hierarchy containing one or more switch components and endpoints. The capability to route peer-to-peer transactions between hierarchy domains through a root complex is optional and implementation dependent. For example, an implementation may incorporate a real or virtual switch internally within the root complex to enable full peer-to-peer support in a software transparent way.

An endpoint 25 is a type of device that can be the requester or completer of a PCI Express transaction either on its own behalf or on behalf of a distinct non-PCI Express device (other than a PCI device or Host CPU). Examples of endpoints include: a PCI Express attached graphics controller, a PCI Express-USB host controller, and a PCI Express attached network interface such as an Ethernet MAC/PHY or InfiniBand Host Channel Adapter (HCA).

Figure 3:
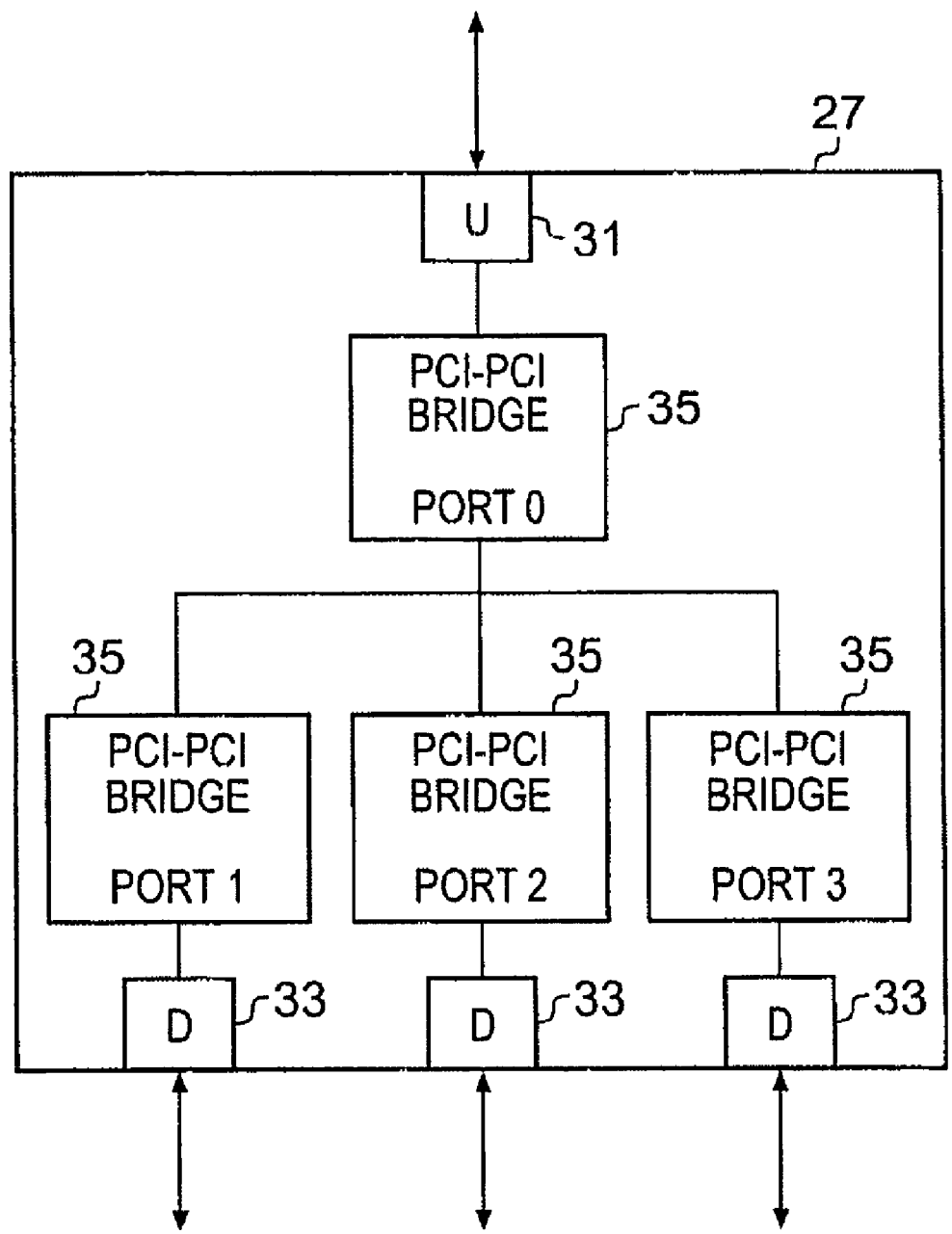
FIG. 3 is a schematic representation of a PCI Express switch.

A switch 27 is a logical assembly of multiple virtual PCI Express to PCI Express bridge devices as illustrated in FIG. 3. As shown in FIG. 3, an upstream port 31 which connects in the direction of a host connects to a number of downstream ports 33 via a switch fabric made up of a number of virtual PCI Express to PCI Express bridges. Switches are governed by a number of rules. Amongst these rules is a requirement that switches appear to configuration software as two or more logical virtual PCI Express to PCI Express bridges and forward transactions using PCI bridge mechanisms; e.g., address based routing. Also, a switch is not allowed to split a packet into smaller packets, e.g., a single packet with a 256-byte payload must not be divided into two packets of 128 bytes payload each. Each virtual PCI Express to PCI Express bridge 35 can be a physical PCI Express to PCI Express bridge or can be an alternative physical structure which is controlled to behave as a PCI Express to PCI Express bridge.

A PCI Express to PCI bridge 28 provides a connection between a PCI Express fabric and a PCI/PCI-X hierarchy. Thereby, conventional PCI/PCI-X devices 29 may be connected to the PCI Express fabric and accessed by a host including a PCI Express root complex.

A PCI Express fabric can be configured using one of two mechanisms. These are: a PCI compatible configuration mechanism which supports 100% binary compatibility with operating systems and host firmware and their corresponding bus enumeration and configuration software that is compatible with PCI rev 2.3 or later; and a PCI Express enhanced configuration mechanism which is provided to increase the size of available configuration space and to optimize access mechanisms.

Each PCI Express link is mapped through a virtual PCI-to-PCI bridge structure and has a logical PCI bus associated with it. The virtual PCI-to-PCI bridge structure may be part of a PCI Express root complex port, a switch upstream port, or a switch downstream port. A root port is a virtual PCI-to-PCI bridge structure that originates a PCI Express hierarchy domain from a PCI Express root complex. Logical devices are mapped into configuration space such that each will respond to a particular device number.

Figure 4:
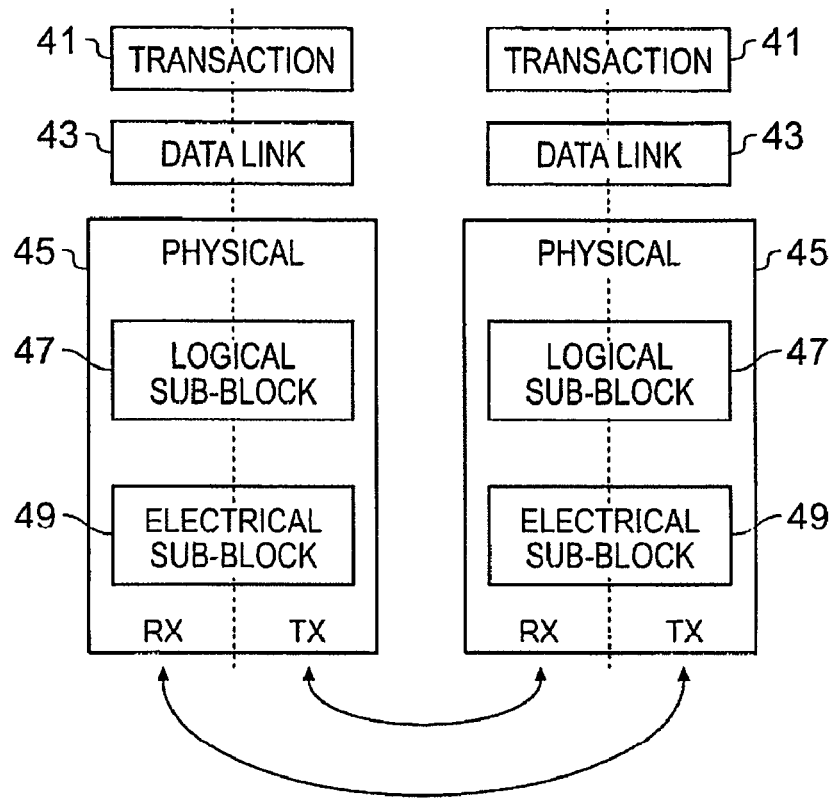
FIG. 4 is a schematic overview of layering within PCI Express.

A schematic overview of the PCI Express architecture in layers is shown in FIG. 4. As shown, there are three discrete logical layers: the transaction layer 41, the data link layer 43, and the physical layer 45. Each of these layers is divided into two sections: one that processes outbound (to be transmitted) information and one that processes inbound (received) information.

PCI Express uses packets to communicate information between components. Packets are formed in the transaction and data link layers to carry the information from the transmitting component to the receiving component. As the transmitted packets flow through the other layers, they are extended with additional information necessary to handle packets at those layers. At the receiving side the reverse process occurs and packets get transformed from their physical layer representation to the data link layer representation and finally (for transaction layer packets) to the form that can be processed by the transaction layer of the receiving device.

Figure 5:
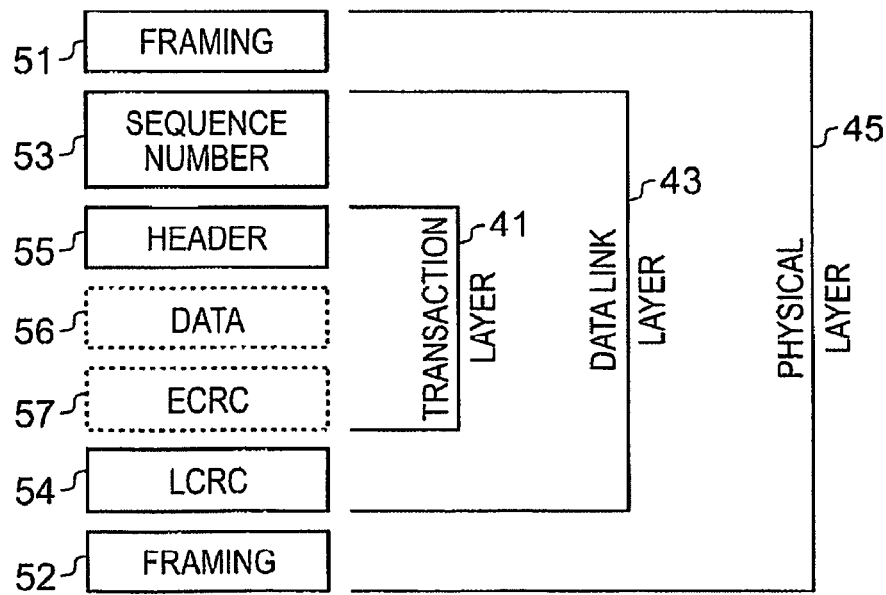
FIG. 5 is a schematic representation of packet flow through the layers shown in FIG. 4.

A conceptual overview of the flow of transaction level packet information through the layers is shown in FIG. 5. Thus the transaction layer 41 provides a packet header 55, and can provide a data payload 56 and an optional end-to-end cyclic redundancy check (ECRC) 57. The data link layer applies a sequence number 53 and a LCRC (Link Cyclic Redundancy Check) 54. The physical layer 45 then provides Framing 51, 52 for the packet. A simpler form of packet communication is supported between two data link layers (connected to the same link) for the purpose of link management.

The upper layer of the architecture is the transaction layer 41. The transaction layer's primary responsibility is the assembly and disassembly of Transaction Layer Packets (TLPs). TLPs are used to communicate transactions, such as read and write, as well as certain types of events. The transaction layer is also responsible for managing credit-based flow control for TLPs.

Every request packet requiring a response packet is implemented as a split transaction. Each packet has a unique identifier that enables response packets to be directed to the correct originator. The packet format supports different forms of addressing depending on the type of the transaction (Memory, I/O, Configuration, and Message). The packets may also have attributes such as no Snoop and relaxed ordering.

The transaction layer supports four address spaces: the three PCI address spaces (memory, I/O, and configuration) and a message space. According to the PCI Express specification, the message space is used to support all prior sideband signals, such as interrupts, power-management requests, and so on, as in-band message transactions. PCI Express message transactions can be considered as "virtual wires" since their effect is to eliminate the wide array of sideband signals used in a conventional platform implementation.

The middle layer in the stack, the data link layer 43, serves as an intermediate stage between the transaction layer 41 and the physical layer 45. The primary responsibilities of the data link layer 41 include link management and data integrity, including error detection and error correction.

The transmission side of the data link layer 43 accepts TLPs assembled by the transaction layer 41, calculates and applies a data protection code and TLP sequence number, and submits them to physical layer 45 for transmission across the link. The receiving data link layer 43 is responsible for checking the integrity of received TLPs and for submitting them to the transaction layer 41 for further processing. On detection of TLP error(s), this layer is responsible for requesting retransmission of TLPs until information is correctly received, or the link is determined to have failed.

The data link layer 43 also generates and consumes packets that are used for link management functions. To differentiate these packets (TLP) from those used by the transaction layer, the term Data Link Layer Packet (DLLP) is used when referring to packets that are generated and consumed at the data link layer.

The physical layer 45 includes all circuitry (electrical sub-block 49) for interface operation, including driver and input buffers, parallel-to-serial and serial-to-parallel conversion, PLL(s) (Phase-locked-loops), and impedance matching circuitry. It includes also logical functions (logic sub-block 47) related to interface initialization and maintenance. The physical layer 45 exchanges information with the data link layer 43 in an implementation-specific format. This layer is responsible for converting information received from the data link layer 43 into an appropriate serialized format and transmitting it across the PCI Express link at a frequency and width compatible with the device connected to the other side of the link.

The PCI Express architecture has various facilities to support future performance enhancements via speed upgrades and advanced encoding techniques. Depending on actual implementation of these enhancements, the future speeds, encoding techniques or media may only impact the physical layer definition.

The transaction layer 41, in the process of generating and receiving TLPs, exchanges flow control information with its complementary transaction layer 41 on the other side of the link. It is also responsible for supporting both software and hardware-initiated power management.

Initialization and configuration functions require the transaction layer 41 to store link configuration information generated by the processor or management device and store link capabilities generated by physical layer hardware negotiation of width and operational frequency.

A transaction layer's packet generation and processing services require it to: generate TLPs from device core requests; convert received request TLPs into requests for the device core; convert received completion packets into a payload, or status information, deliverable to the core; detect unsupported TLPs and invoke appropriate mechanisms for handling them; and if end-to-end data integrity is supported, generate the end-to-end data integrity CRC and update the TLP header accordingly.

Within flow control, the transaction layer 41 tracks flow control credits for TLPs across the link. Transaction credit status is periodically transmitted to the remote transaction layer using transport services of the data link layer. Remote flow control information is used to throttle TLP transmission.

The transaction layer 41 can also implement ordering rules including the PCI/PCI-X compliant producer consumer ordering model and extensions to support relaxed ordering.

Power management services within the transaction layer 41 may include: ACPI/PCI power management, as dictated by system software; and hardware-controlled autonomous power management minimizes power during full-on power states.

The transaction layer 41 can also implement handling of virtual channels and traffic class. The combination of virtual channel mechanism and traffic class identification is provided to support differentiated services and QoS (Quality of Service) support for certain classes of applications. Virtual channels provide a means to support multiple independent logical data flows over given common physical resources of the link. Conceptually this involves multiplexing different data flows onto a single physical link. The traffic class is a transaction layer packet label that is transmitted unmodified end-to-end through the fabric. At every service point (e.g., switch) within the fabric, traffic class labels are used to apply appropriate servicing policies. Each traffic class label defines a unique ordering domain—no ordering guarantees are provided for packets that contain different traffic class labels.

The data link layer 43 is responsible for reliably exchanging information with its counterpart on the opposite side of the link. Accordingly, it has responsibility for initialization and power management services to: accept power state requests from the transaction layer 41 and convey them to the physical layer 45; and to convey active/reset/disconnected/ power managed state information to the transaction layer 41.

The data link layer 43 also provides data protection, error checking, and retry services including: CRC generation; transmitted TLP storage for data link level retry; error checking; TLP acknowledgment and retry messages; and error indication for error reporting and logging.

The physical layer 45 provides services relating to interface initialization, maintenance control, and status tracking, including: reset/hot-plug control/status; Interconnect power management; width and lane mapping negotiation; and polarity reversal. The physical layer 45 can also provide services relating to symbol and special ordered set generation including: 8-bit/10-bit encoding/decoding; and embedded clock tuning and alignment.

Within symbol transmission and alignment, the physical layer 45 can provide services including: transmission circuits; reception circuits; elastic buffer at receiving side; and multi-lane de-skew (for widths >×1) at receiving side. The physical layer 45 can also provide system DFT (Design For Test) support features.

The inter-layer interfaces support the passing of packets and management information. The transaction/data link interface provides: byte or multi-byte data to be sent across the link (including a local TLP-transfer handshake mechanism, and TLP boundary information); and requested power state for the link. The data link to transaction interface provides: byte or multi-byte data received from the PCI Express link; TLP framing information for the received byte; actual power state for the link; and link status information.

The data link to physical interface provides: byte or multi-byte wide data to be sent across the link (including a data transfer handshake mechanism and TLP and DLLP boundary information for bytes); and requested power state for the link. The physical to data link interface provides: byte or multi-byte wide data received from the PCI Express link; TLP and DLLP framing information for data; indication of errors detected by the physical layer; actual power state for the link; and connection status information.

Thus there has now been described an overview of the basic principles of the PCI Express interface architecture. Further information regarding the architecture can be obtained from the PCI Special Interest Group and from a variety of texts describing the architecture, such as "Introduction to PCI Express: A Hardware and Software Developer's Guide" ISBN: 0970284691, and "PCI Express System Architecture" ISBN: 0321156307.

As described above, a PCI Express switch provides a single upstream port and one or more downstream ports. Configuration of the ports can be carried out using the PCI Express configuration space headers. Examples of relevant headers are shown in FIGS. 6 and 7. Any given port can be configured as upstream port. Each port behaves as a PCI Express to PCI Express bridge as specified by the PCI Express Base Specification and P2P Bridge Specification (and can therefore be considered to be a virtual PCI Express to PCI Express bridge (P2P). Each P2P bridge is identified through the class code register in the Type 1 header being equal to a P2P (0x060400). Note that in accordance with the PCI Express specification, a PCI Express endpoint control and status register description is defined as a Type 0 and a P2P control and status register is defined as a Type 1. The class code is part of the control and status register in the Type 0/1 headers.

A conventional PCI Express switch is shown in FIG. 3 and described above. During system initialization, a bus-walk is performed by the system platform 24 (the owner of root complex 21). The bus-walk takes place as a series of configuration requests. Each device in a PCI Express hierarchy (including a switch port P2P device) is identified using a BDF (Bus Device Function number). Each transaction layer packet which is transferred over the fabric includes a Requester ID field which is equal to the BDF of the requester of a transaction. In some cases, the packet may also include a Completer ID, which is the BDF of the completer of the transaction. The value of the Type 0/1 headers may be transmitted as payload to a transaction layer packet request or completion. The BDF is a 16-bit field composed of a bus number (8-bit, BN), a device number (5-bit, DN) and a function number (3-bit, FN). After the bus-walk is complete, the system platform performs bus enumeration by conducting a series of configuration write requests which include values which reflect the Type 0/1 headers within the payload to each device in the PCI Express hierarchy. This process assigns each device with a unique bus number. The root complex of a given hierarchy is always assigned bus number 0.

For example, in the switch shown in FIG. 3, the upstream port (PORT 0) may have a primary bus number of 1 (00000001), a secondary bus number of 2 (00000010) (being a bridge, the P2P has one bus number for each bus to which it is connected), a device number of 0 (00000) in accordance with the PCI Express specification, and a function number of 0 (000). The upstream port is identified as an upstream port through PCI Express Capabilities CSR Device Port Type field (the location of which is identified by the capability pointer field in the header) of the P2P control and status register within the upstream port Type 1 configuration header. Each downstream port (PORT 1, PORT 2, and PORT 3) has a primary bus number of 2 (00000010), and respective ports may have respective device numbers, e.g. PORT 1 may have device number 1 (00001), PORT 2 may have device number 2 (00010), and PORT 3 may have device number 3 (00011). In the case of the devices attached to the ports being single function devices, each will have a function number of 0 (000). If the attached devices were to be multi-function devices, the first function of any given device will be 0, with further functions being assigned function numbers in the range 1-7 as made possible by the three bits of the function number.

All P2P bridges are accessed through Type 1 configuration requests. This means that the configuration requests used by the host platform/root complex to enumerate the bus contain the values of the Type 1 header in its payload field. An example of the PCI Express Type 1 configuration space header is shown in FIG. 6. As can be seen from the Figure, the Type 1 header includes fields identifying the device (Device ID, which is a physical device identifier, and Vendor ID, which is an identifier of the vendor company of the device). The Type 1 header also includes fields describing the status of the device (status and command), which is the command and status register which provides status and control over the PCI Express interface. The class code field is used to define the type of device, as indicated above the P2P bridge is identified by a class code of 0x060400. The Type 1 header also has fields to identify the primary and secondary bus numbers of the P2P, and fields for BARs, and base/limit fields. The remaining fields are not of direct relevance to the present discussion, so in the interests of not obscuring the present disclosure, the reader's attention is directed to the PCI Express base specification for full details of these fields.

The downstream ports are accessed using Type 1 configuration requests with a BDF of {BN=virtual PCI Bus (2 in FIG. 3), DN=actual port/device, FN=0}.

Also, respective ports may have respective secondary bus numbers, e.g. PORT 1 may have secondary bus number 3 (00000011), PORT 2 may have secondary bus number 4

(00000100), and PORT 3 may have secondary bus number 5 (00000101). Any of the devices may have a subordinate bus number (also identified in the Type 1 header) depending on the way in which the device is connected to the port. In the present example, it is assumed that device 3 connects to PORT 3 via a further P2P device. That further P2P has a primary bus number of 5 and a secondary bus number of 6, thus the subordinate bus number of PORT 3 in the present example is 6 (00000110). The subordinate bus number is the last bus number in the downstream hierarchy of a given port. The upstream port forwards Type 1 configuration requests to downstream ports when the configuration requests target a downstream port's subordinate bus. In case of an endpoint device being directly connected to a downstream port, the downstream P2P converts the Type I configuration request into a Type 0 configuration request. An example of the Type 0 configuration space header is shown in FIG. 7. As can be seen from that Figure, many of the fields are common to both Type 0 and Type 1 headers.

Of the fields in the Type 0 header which are not used in the Type 1 header, the Min_Gnt and Max-Lat headers are not used in PCI Express and are set to 0 value and read only status for PCI Express configuration. The remaining fields are not of direct relevance to the present discussion, so in the interests of not obscuring the present disclosure, the reader's attention is directed to the PCI Express base specification for full details of these fields.

During configuration, memory space (defined by a Base Address Register, or BAR) claimed by devices is discovered and assigned by the platform. After configuration, the BARs of a given port reflect the cumulative BARs for all downstream devices (i.e. downstream devices are mapped in contiguous address regions). For example, the BAR of PORT 1 may have a base of x0200 and a limit of x02FF, the BAR of PORT 2 may have a base of x0300 and a limit of x03FF, and the BAR of PORT 3 may have a base of x0400 and a limit of x04FF. Thus the BAR of PORT 0 must have a base of x0200 or lower and a limit of x04FF or higher. As each PORT has its own BAR space defined in the Type 1 header, PORT 0 must also have a BAR space for itself, thus in the present example, PORT 0 has a BAR with a base of x0100 and a limit of x04FF. There are independent BARs for each of the three PCI address spaces. The I/O BAR has a 16 or 32-bit address, the memory BAR has a 32-bit address, and the prefetch memory BAR has a 32 or 64-bit address. According to the PCI Express specification, all PCI Express endpoints with the prefetchable bit set must support 64-bit addressing. To simplify address decoding, the I/O BAR supports 4 k page granularity, and the memory BARs use 1 MB granularity. Fields are provided in the Type 1 header to identify the address ranges in the prefetchable, I/O and memory categories.

Memory requests & I/O requests are routed based upon address. In the downstream direction a request is forwarded (or processed) if the address falls within the port's BAR. Upstream forwarding is based upon inverse decode relative to the same BARs. Within a switch each P2P (port) provides separate BAR registers for each of the three address spaces. In order for a port to make a forwarding decision, it must have explicit knowledge of the other ports' BAR ranges.

Thus the initialization and configuration of a PCI Express switch have been described.

Figure 8:
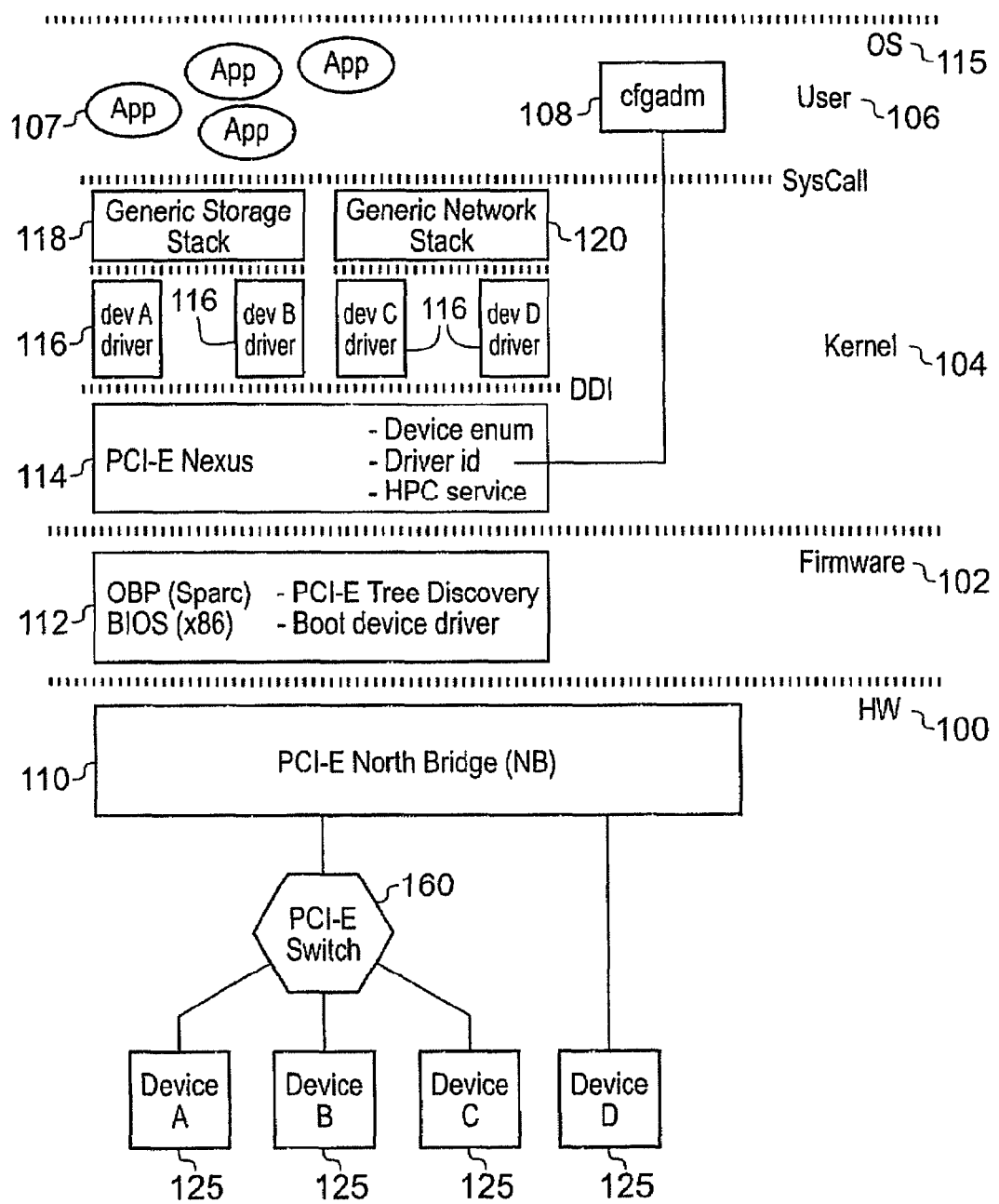
FIG. 8 is a schematic overview of an I/O software framework.

FIG. 8 provides a schematic overview of an example of an I/O software framework, in the present example a Solaris I/O software framework on a host. The software framework provides access to one or more I/O devices 125 via hardware 100 including a Northbridge 110 and a PCI-E switch 160. The platform (e.g., SPARC or x86) provides firmware 102 (e.g., OBP or BIOS 112) used before the operating system (OS) is booted. This firmware 102 and the OS software 115 combine to provide discovery and configuration (bus enumeration) of a PCI device tree. The Solaris OS run-time environment includes a kernel space 104 and a user space 106. A PCI-E Nexus driver (there are similar drivers in other operating systems) 114 in the kernel space 104 provides device enumeration, driver identification, drivers for the hostbridge and switches, and HPC (Hot-Plug Control) service. Each device 125 is handled either by a generic class driver or by a device specific driver 116 that interfaces to the (Solaris) environment via a Nexus device driver interface (DDI/DKI—Device Driver interface/Device Kernel Interface). Network device drivers interface to a generic OS network stack 120. Similarly, a generic storage stack 118 is provided for storage devices. In the user space 106, in which the applications 107 reside, device specific configuration commands and other generic commands for driver and device configuration could be issued through specific CLI (Command Line Interface) applications like cfgadm( ) and ifconfig( ) 108. It will be appreciated that other software frameworks are possible, for example a framework based on another operating system such as a Microsoft Windows OS, a Linux OS, etc.

The switch 160 illustrated in FIG. 8 forms an example of an interconnect apparatus that could be implemented in one or more integrated circuits. An example of such an integrated circuit could be an application specific integrated circuit (ASIC). In such an interconnect apparatus, there is a need to provide buffers for the temporary storage of information.

In the following, with reference to FIGS. 9 to 11, there will now be described examples of an interconnect apparatus that includes a buffer that can facilitate speed matching.

Figure 9:
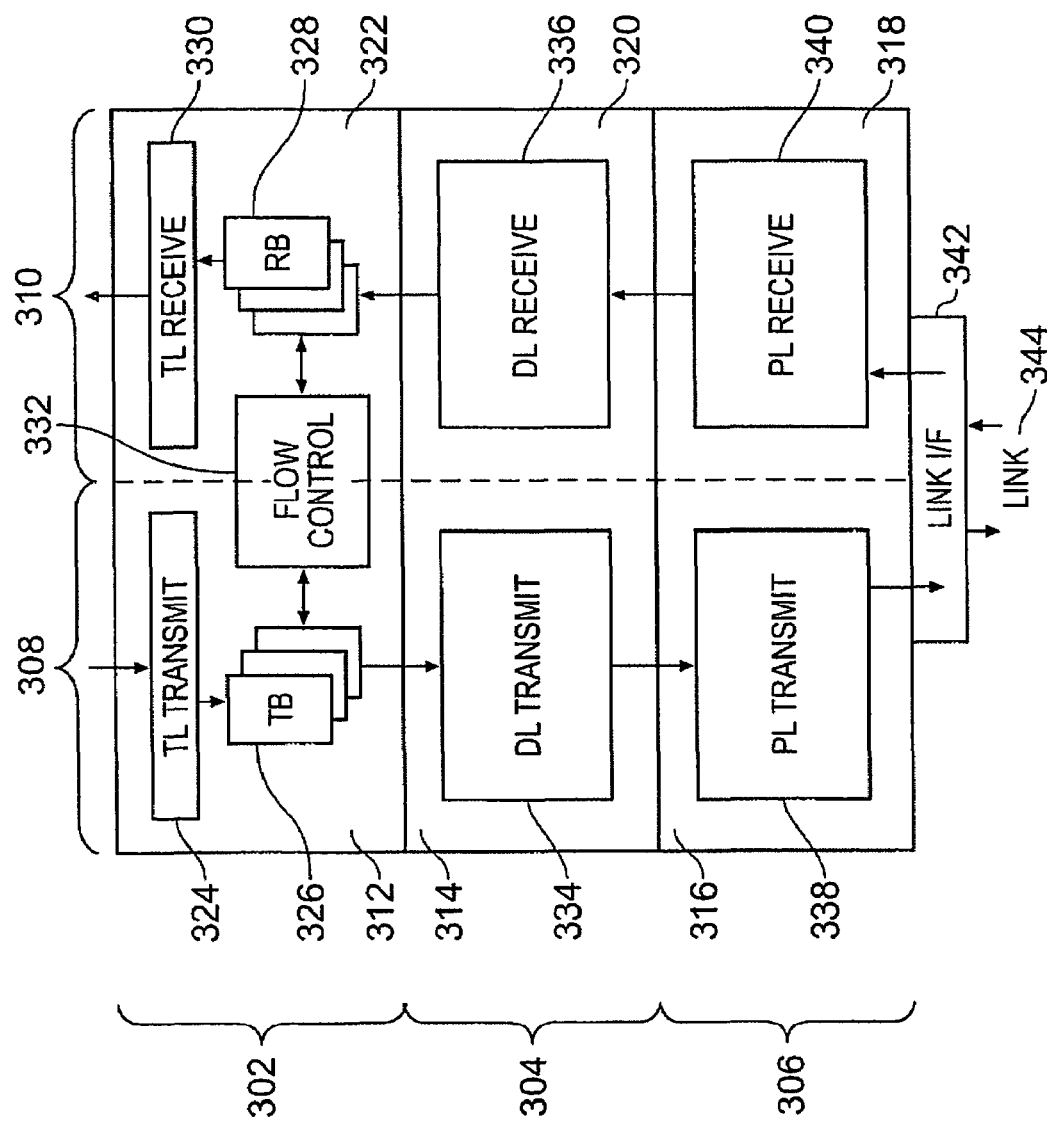
FIG. 9 is a schematic block diagram of a data link transmitter/receiver.

FIG. 9 provides a schematic overview of the device layers within a port.

As represented in FIG. 9, the port includes three basic layers, including a transaction layer 302, a data link layer 304 and a physical layer 306. The physical layer 306 interfaces via a link interface 342 to a physical link 344. Within the various layers, the logic is configured to form a transmit side 308 and a receive side 310.

Within the transmit side 308, there is therefore a transaction layer transmit portion 312, a data link layer transmit portion 314 and a physical layer transmit portion 316. On the receive side 310, there is a physical layer receive portion 318, a data link layer receive portion 320 and a transaction layer receive portion 322.

When a message is to be sent via the link 344, the information concerned is received by transaction layer transmit logic 324 in the transaction layer transmit portion 312, and is buffered in transaction buffers 326. The data received into the transaction buffers 326 can be received at variable speeds. The data from the transaction buffers 326 is processed in the data link layer transmit logic 334 in the data link layer transmit portion 314 before being passed to physical layer transmit logic 338 in the physical layer transmit portion 316. The data processed by the physical layer transmit logic 338 for passing via the link interface 342 to the link 344 is passed at a constant rate determined by the speed of the link 344. When data is received from the link 344 it is passed by the link interface 342 to physical layer receive logic 340 in the physical layer receive portion 318. This data is then passed, at the speed of the link, to the data link layer receive logic 336 in the data link layer receive portion 320. After processing by the data link layer receive logic 336, the received information is passed to the receive buffers 328 in the transaction layer receive portion 322, and is then processed by the transaction layer receive logic 330, once again at a rate dictated by the speed of the link 344.

Flow control logic 332 in the transaction layer 302 is operable to prevent a transaction layer packet being transmitted over the link to a remote receiver device unless the receiver device has appropriate buffer space to accept TLPs of a given traffic class. Flow control is automatically managed and is transparent to software. However, the problem remains that the speed of the input data received by the transaction layer transmit logic 324 and passed from the buffers 326 to the data link layer transmit logic 334 can be at a variable rate that does not match the speed of the link 344.

To account for such differences in bandwidth between input and output ports, an example embodiment of the invention can provide for data link layer buffering.

In the described embodiments, which by way of example are directed to a PCI Express interconnect apparatus, a PCI Express retry buffer is used for speed-matching and as output buffer.

Figure 10:
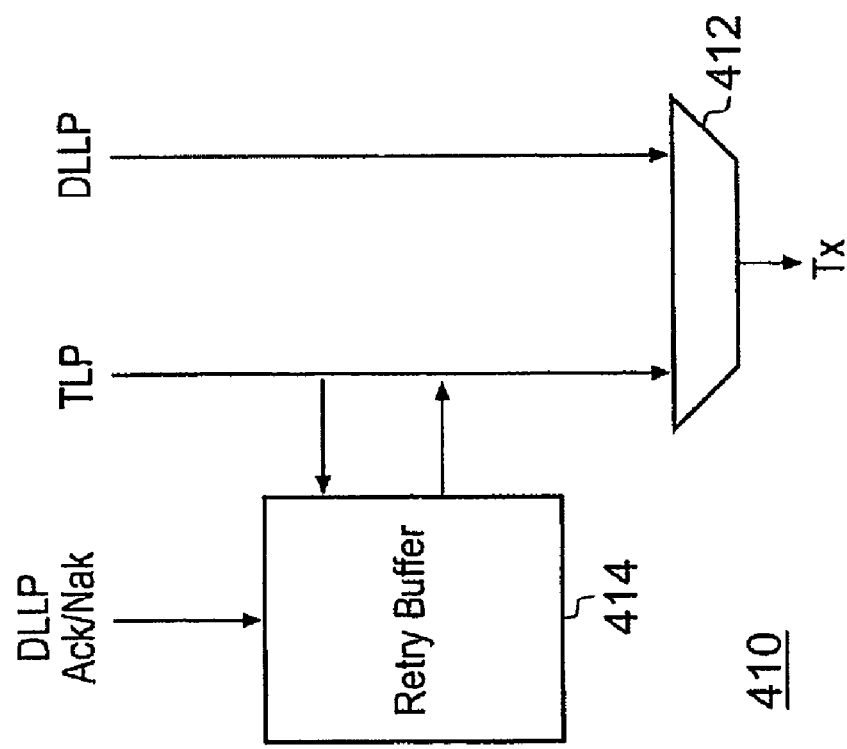
FIG. 10 is a schematic representation of a prior art data link transmitter.

FIG. 10 is a schematic block diagram of elements of a conventional data link layer transmitter 410 illustrating the manner in which PCI Express defines the implementation of a conventional retry buffer. In the conventional data link layer transmitter 410 shown in FIG. 10, transaction layer packets (TLPs) and data link layer packets (DLLPs) are received by a multiplexer 412 for transmission at Tx. The TLPs and DLLPs are merely merged and transmitted. A copy of a TLP is also buffered in a retry buffer 414 prior to being sent, which copies are held there until a DLLP acknowledgement of receipt from a final or intermediate destination is received at the retry buffer. If no acknowledgement is received within a predetermined time (i.e. there is a timeout), or if a DLLP negative acknowledgement (indicative of a TLP not having been received correctly or at all), then the TLPs not received by the destination can be retransmitted from the retry buffer.

In other words, before a device transmits a TLP, it stores a copy of the TLP in the retry buffer 414. This buffer is associated with the data link layer in PCI Express. Each TLP buffer entry can store an entire TLP, including data, headers, optional fields, sequence numbers and cyclic redundancy code (CRC). The size of the buffer is typically set such that it is not a limiting factor for TLP transmissions.

When the data link layer transmitter 410 receives a positive data link layer packet acknowledgement (ACK DLLP) indicative that a transmitted packet has been received at the packet's destination (which may be a final packet destination or an intermediate destination), it purges TLPs from the Retry Buffer. As each TLP is allocated a sequence number, all TLPs with earlier or equal sequence numbers to the one in the received DLLP, can be identified and be removed from the retry buffer 414.

If the transmitter receives a negative data link layer packet acknowledgement (NAK DLLP) indicative that a transmitted packet has not been received at the packet's destination, it purges the retry buffer 414 of TLPs with sequence numbers that are equal to or earlier than a sequence number in the received NAK DLLP and re-transmits the TLPs of later sequence numbers.

Figure 11:
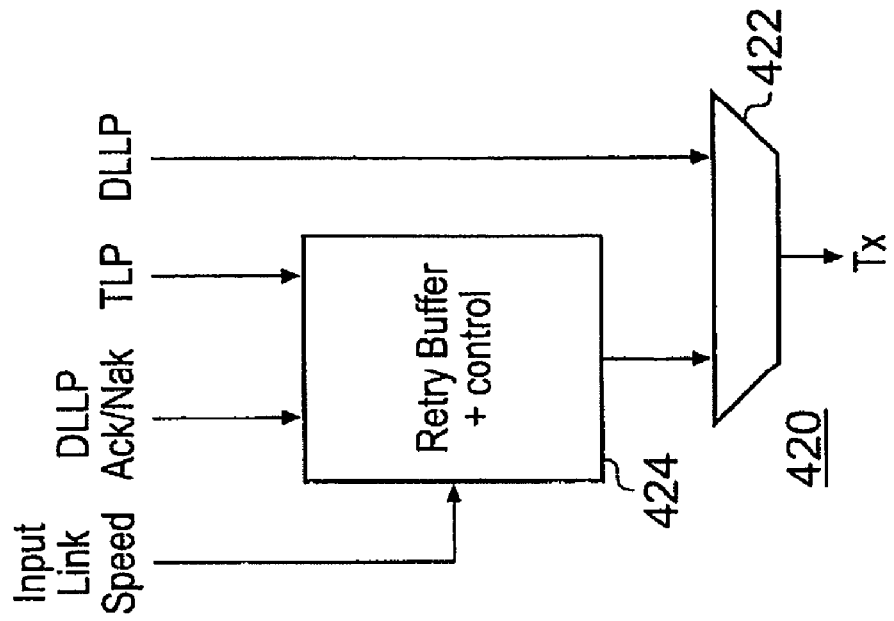
FIG. 11 is a schematic block diagram of an example of a data link transmitter in accordance with an embodiment of the invention.

FIG. 11 illustrates an example embodiment of a data link layer transmitter 420 of an example embodiment of the invention in which a retry buffer and control (RTC) unit 424 provides the functionality of a combined retry buffer and output buffer enabling both retry and speed matching capabilities.

As shown in FIG. 11, the RTC unit 424 is operable to buffer all TLPs for transmission. The RTC unit 424 receives all TLPs for transmission and input link speed (ILS) data to control output buffering and speed matching and further receives ACK DLLPs and NAK DLLPs to control retry functionality. The TLPs output from the RTC unit 424 are supplied to a multiplexer 422 that multiplexes TLPs and DLLPs to be transmitted (Tx).

In the example embodiment of the invention represented in FIG. 11, all TLPs to be transmitted use the retry buffer as an output buffer such that speed matching can be accommodated in the retry buffer. In operation, when an input bandwidth is higher than an output bandwidth, a TLP can be transmitted on to a PCI Express link immediately on being written to the retry buffer. When an input bandwidth is lower than an output bandwidth, an adaptive routine is operable to take input speed, output speed and packet length into account is used before starting the packet transmission. In an example of interconnect apparatus for PCI Express, credit handling can be taken care of at the transaction layer, whereby TLPs in the retry buffer have already passed the credit checks. Packets are therefore ready for transmission on the link.

The RTC unit of FIG. 11 can be provided with a mechanism for identifying TLPs that have been transmitted and TLPs yet to be transmitted.

For example, the RTC unit of FIG. 11 could be provided with a flag for every packet. When a packet is added to the retry buffer, such a sent flag could be set to a "not sent" state, and the sent flag could be set to a "sent" state when the packet is sent onto the PCI Express link. The sent flag could thus provide a way of identifying packets that are not already transmitted on the PCI Express link that are not to be "retransmitted" on reception of a NAK DLLP.

However, in an example embodiment to be described later, a mechanism for identifying TLPs that have been transmitted and transaction packets yet to be transmitted is provided through the use of write and read pointers to an address buffer that identifies locations at which TLPs are buffered. In the example embodiment to be described, a read pointer indicates an address buffer entry for a next TLP to be transmitted, a write pointer indicates an address buffer entry for a next TLP to be added to the buffer, and a last acknowledged sequence number pointer identifies an address buffer entry for the TLP having a sequence number for which an acknowledgment of receipt from the packet destination was last received. In this example therefore, the write pointer and the read pointer form a mechanism for identifying TLPs that have been transmitted and TLPs yet to be transmitted in that the packets between the write pointer and the read pointer are the TLPs yet to be transmitted.

The example embodiment of the invention described hereinafter can combine the functions of an output buffer and a retry buffer, thus enabling a significant amount of memory to be saved on output buffering, and the complexity of an interconnect apparatus to be simplified. As the full internal bandwidth of an interconnect apparatus (e.g., a switch) can be used, this can also have the effect of improving the performance of the interconnect apparatus.

Figure 12:
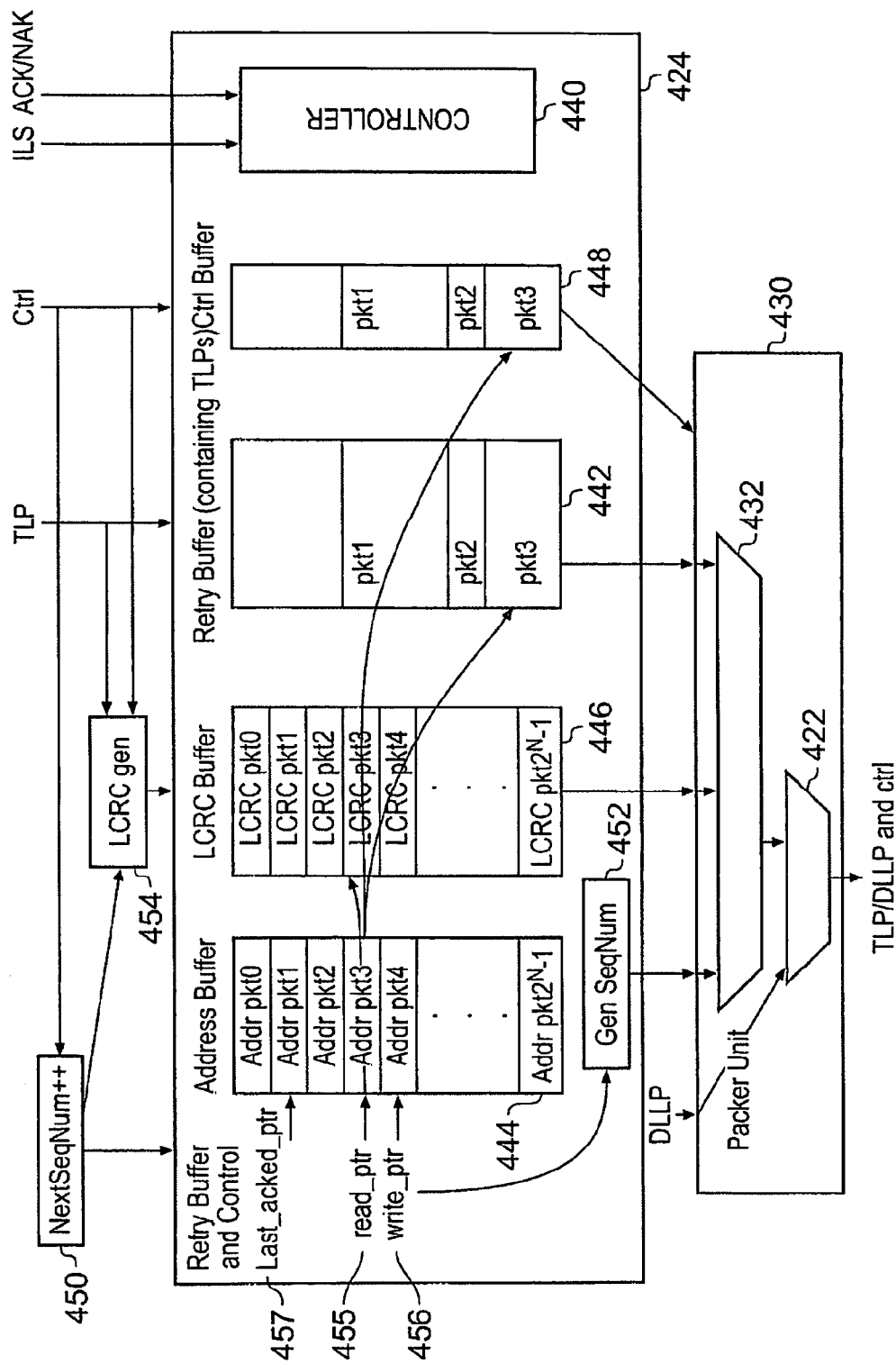
FIG. 12 is a schematic block diagram of a retry buffer control unit of the data link transmitter of FIG. 11.

FIG. 12 is a schematic overview of an example of data layer transmitter 420 of FIG. 11, illustrating the RTC unit 424 in more detail. In this example, a retry buffer 442, which forms a transaction buffer, receives and holds the TLPs for transmission, for example TLPs represented as packets pkt1, pkt2, pkt3, in the retry buffer 442.

In the example shown in FIG. 12, a controller 440 is provided that receives the ILS data and the ACK DLLPs and NAK DLLPs to provide the control functionality within the RTC unit 424. The address buffer 444 is operable to hold information (e.g., pointers) for identifying the locations of the TLPs in the retry buffer 442. An LCRC buffer 446 is operable to hold a link cyclical redundancy check (LCRCs) for each TLP. A control buffer 448 is operable to hold control metadata (Crtl) for the TLPs, for example packet start, packet end, errors metadata, etc.

In the present example, the address buffer has $2^N$ entries ($0$-$2^N$-$1$), so that a maximum number of $2^N$ packet contexts can be stored at any one time. In this example, as the address buffer has a size divisible by 2, the index or address to the address buffer is used in the calculation and/or comparison of sequence numbers. More generally, the address buffer can hold M×N entries, thus having a size divisible by M, where M is a positive integer. The width of the address buffer can be dependent on the size of the retry buffer. For example, in the present example, the address buffer is configured to contain addresses for identifying the locations of the TLPs in the retry buffer.

In the present example the address buffer can be accessed using three pointers, maintained by and/or forming part of the controller 440, namely a read pointer (read_ptr) 455 indicating an address buffer location for the address of the next TLP to be transmitted, a write pointer (write_ptr) 456 indicating an address buffer location for the address of a next TLP to be added to the buffer, and a last acknowledged sequence number pointer (last_acked_ptr) 457 indicating an address buffer location for the address of the TLP having the sequence number for which an acknowledgment of receipt from the packet destination was last received.

In the example in FIG. 12:

---

Pkt0 is a TLP where sequence number mod ($2^N$) = 0
Pkt1 is a TLP where sequence number mod ($2^N$) = 1
.
.
.
Pkt$2^N$ − 1 is a TLP where sequence number mod ($2^N$) = $2^N$ − 1
write_ptr = NextSeqNum [N−1:0]
last_acked_ptr = last_acked_seqnumber [N−1 :0]

---

In the present example, the controller 440 is operable to generate sequence numbers using a sequence number generator (GenSeqNum) 452 when TLPs first are sent. In operation, a TLP received by the data link transmitter 424 for transmission is stored in the retry buffer 442 and the address of the start of this packet is stored in the address buffer 444 at the address buffer location identified by the write pointer. The entry in the address buffer 444 where an address is stored is formed by the lower bits of a counter for a next sequence number (NextSeqNum) counter 450. This counter is increased for every TLP sent.

Every time a TLP is sent, the latest sequence number is allocated to it. This sequence number is found in the next sequence number counter 450.

In the event of a resend (otherwise known as a replay), the sequence numbers for many TLPs might have to be regenerated. The generation of these sequence numbers can be performed in the following manner. The last acknowledged sequence number (last_acked_seqnumber) or a sequence number from a NAK DLLP can be used as a base sequence number. The sequence number for the first TLP for the resend can then be, where a timeout caused the replay, the last_acked_seqnumber+1, for the second TLP can then be last_acked_seqnum+2, . . . and so on until sequence number reaches a stored version of the read pointer (read_ptr). The sequence number for the current read_ptr can be calculated as follows:

SeqNum=last_acked_seqnum+(read_ptr−last_acked_ptr)

This function can be used when packets are stored in the retry buffer and transmitted.

Figure 13:
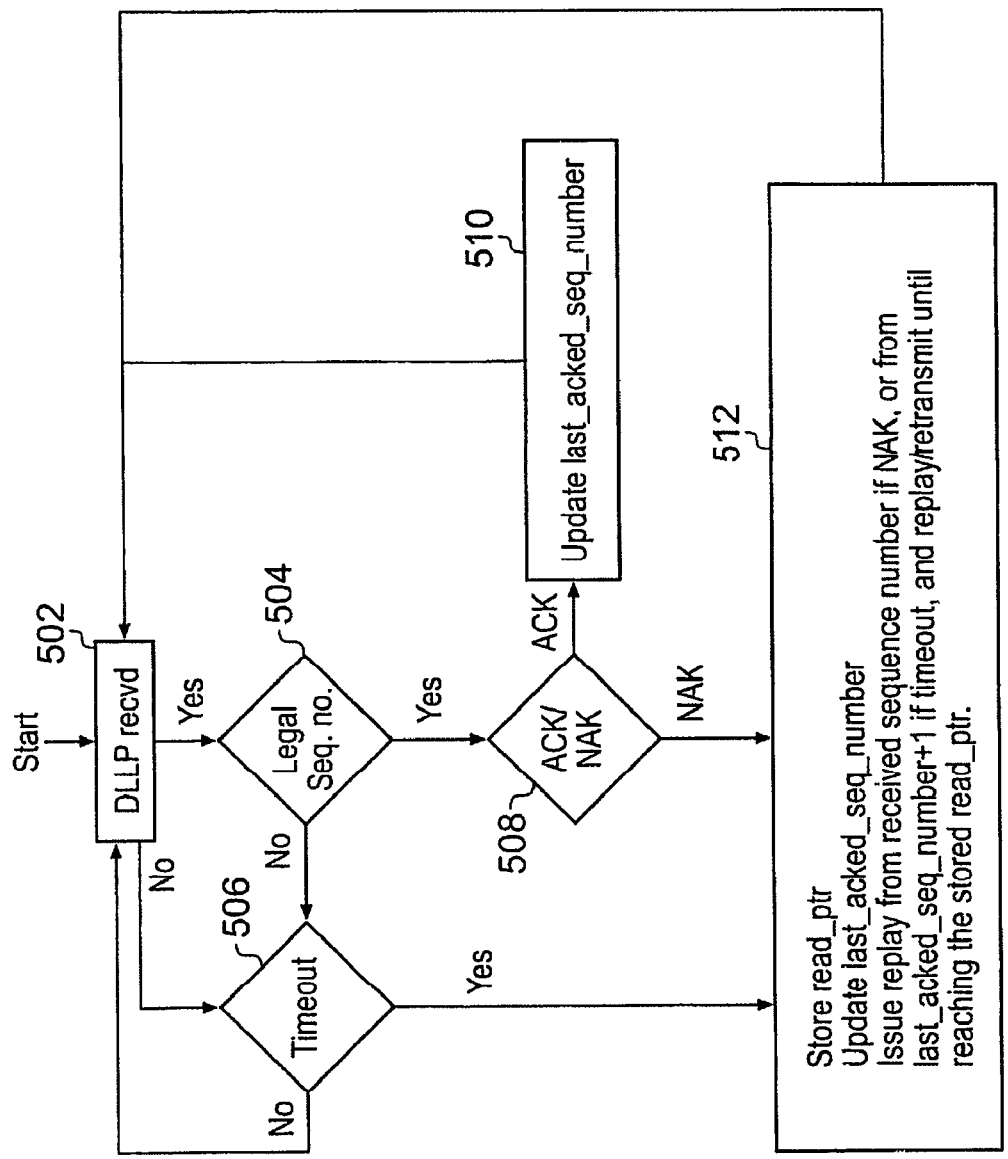
FIG. 13 is a flow diagram illustrating an example of operation of the data link transmitter of FIG. 11.

FIG. 13 is a flow diagram illustrating an example of ACK/NAK flow.

If, at 502, a DLLP is received, the sequence number provided with the DLLP is checked at 504 to see if it is inside a legal range, i.e. between NextSeqNumber and the last_acked_seqnum.

If it is determined at 504 that it is a legal sequence number, and it is determined at 508 that the DLLP is an ACK DLLP, then at 510 the last_acked_seqnum is updated to this new value. As the last_acked_ptr is formed from the N least significant bits of last_acked_seqnum this can be updated accordingly.

If it is determined at 504 that it is a legal sequence number, and it is determined at 508 that the DLLP is a NAK DLLP, then at 512 the read_ptr is stored so a track can be kept of how many packets are to be replayed. Also at 512, the last_acked_seqnum is updated to the value before the sequence number that received the NAK and a resend is performed (in other words, a replay is issued) such that all packets from the received sequence number to the stored version of the read_ptr are resent.

If is determined at 506 that a timeout has occurred, for example if no DLLP is received at 502 or if a sequence number for a received DLLP is found at 504 to be invalid, then at 512 the read_ptr is stored, so a track can be kept of how many packets are to be replayed, and all packets from the last_acked_seq_number+1 to the stored version of the read_ptr are replayed/retransmitted.

It will be noted that in this example, when an ACK DLLP or a NAK DLLP is received, a sequence number comparison is performed before a purge or a retransmit is performed. When a legal sequence number is detected the last_acked_seqnum is updated with the new value. The sequence number compare is done by checking that the received sequence number is within the range of NextSeqNum and last_acked_seqnum. If it is, then the sequence number is determined to be valid. If it is not, then the sequence number is determined to be invalid.

The comparison of sequence numbers can be performed as follows:

--- if((NextSeqNum − seq_num_recv <$2^{12}$/2)&&
(last_acked_seqnumber − seq_num_recv >= $2^{12}$/2))
=> sequence number hit

---

In the example embodiment of FIG. 12, the address buffer 444 and the LCRC buffer 446 have the same number of lines, so the index used to address into the address buffer can also be used as the address to the LCRC buffer 446 for the LCRC for a particular packet. The retry buffer 442 and the control buffer 448 have the same number of lines, so that data can be read from both buffers using the same address, as provided by the addresses in the address buffer 444.

In order to provide for speed matching, the controller 440 is responsive to the relative bus speeds to control the buffering of the data in the retry buffer. It is also to be noted that the amount of available space, or credit, in the retry buffer 442 is signaled to the flow control logic 332 of the transaction layer 302 (see FIG. 9). The flow control logic 332 can be configured to stop the passing of TLPs from the transmit buffers 326 (see FIG. 9) to the data link layer 304 in the case that the retry buffer becomes full.

Thus, for example where the input speed is faster than the output speed (say the input stream=16× and the output stream=4×) then there is no danger of underrun, and packet transmission can start as soon as a packet is received in the retry buffer. In this case, however, the retry buffer 442 will eventually fill up. If the retry buffer 442 does fill up then this will be noted by the flow control logic 332 of the transaction layer and TLPs will be held in the transmit buffers 326 of the transaction layer until space becomes available in the retry buffer 442. In the event of a resend, the read_ptr is stored and the resend starts from sequence number received, and continues until the stored value of the read_ptr is reached.

However, where the input speed is slower than the output speed (say the input stream=4× and the output stream=16×) then there is a possible danger of a data underrun. This can be avoided by making sure that the whole packet is stored before it is transmitted. The input data speed is therefore checked against output speed to see if there is a difference and store-and-forward is required.

Thus there has been described an example of an interconnect apparatus, for example a switch that supports PCI Express. The interconnect apparatus includes a transaction packet buffer and control logic. The control logic can be operable to write sequentially transaction packets for transmission to the transaction packet buffer and to transmit the buffered transaction packets in sequence to a destination. The control logic can further be operable, on receipt of a control packet indicative of non-receipt by the destination of a transmitted transaction packet, to retransmit the non-received transaction packet and transaction packets transmitted from the transaction packet buffer subsequent to the non-received transaction packet.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. An interconnect apparatus comprising a transaction packet buffer and control logic operable sequentially to write transaction packets for transmission to the transaction packet buffer and operable to transmit the buffered transaction packets in sequence to a destination, the control logic farther being operable to:
on receipt of a control packet indicative of non-receipt by the destination of a transmitted transaction packet to retransmit the non-received transaction packet and transaction packets transmitted from the transaction packet buffer subsequent to the non-received transaction packet;
in response to the absence of a control packet indicative of non-receipt by the destination of a transmitted transaction packet within a predetermined period to retransmit the transaction packets transmitted from the transaction packet buffer subsequent to a transaction packet for which an acknowledgment of receipt from the packet destination was last received;
wherein the control logic comprises an address buffer, each entry in the address buffer identifying a location in the transaction packet buffer at which a corresponding transaction packet is stored; and
wherein the control logic comprises a read pointer indicating an address buffer entry for a next transaction packet to be transmitted, a write pointer indicating an address buffer entry for a next transaction packet to be added to the buffer, and a last acknowledged sequence number pointer indicating an address buffer entry for the transaction packet having a sequence number for which an acknowledgment of receipt from the packet destination was last received.

2. The interconnect apparatus of claim 1, wherein the control logic identifies transaction packets in the transaction packet buffer that have been transmitted and transaction packets yet to be transmitted.

3. The interconnection apparatus of claim 1, wherein each transaction packet is allocated a sequence number from a range of N sequence numbers.

4. The interconnect apparatus of claim 1, wherein the control logic is operable to update the last acknowledged sequence number pointer in response to receipt of an acknowledgement indicative of a transmitted transaction packet having been received at the destination.

5. The interconnect apparatus of claim 1, operable under a PCI Express protocol.

6. The interconnect apparatus of claim 1, wherein the transaction packet is a transaction layer packet and the control packet is a data layer packet.

7. The interconnect apparatus of claim 2, wherein the control logic is operable to identify a transaction packet buffer location to which a next transaction packet is to be stored in the buffer and is operable to identify a transaction packet buffer location from which a next transaction packet is to be transmitted.

8. The interconnection apparatus of claim 3, wherein the address buffer comprises M×N entries.

9. The interconnect apparatus of claim 7, wherein the control logic is operable to identify a transaction packet buffer location in which the transaction packets most recently transmitted for which an acknowledgment of receipt from the packet destination was received.

10. The interconnection apparatus of claim 8, wherein the sequence numbers correspond to lower order address bits of addresses of the address buffer entries.

11. A computer system including an interconnect apparatus comprising a transaction packet buffer and control logic operable to write sequentially transaction packets for transmission to the transaction packet buffer and operable to transmit the buffered transaction packets in sequence to a destination, the control logic further being operable to:
on receipt of a control packet indicative of non-receipt by the destination of a transmitted transaction packet to retransmit the non-received transaction packet and transaction packets transmitted from the transaction packet buffer subsequent to the non-received transaction packet;
in response to the absence of a control packet indicative of non-receipt by the destination of a transmitted transaction packet within a predetermined period to retransmit the transaction packets transmitted from the transaction packet buffer subsequent to a transaction packet for which an acknowledgment of receipt from the packet destination was last received;
wherein the control logic comprises an address buffer, each entry in the address buffer identifying a location in the transaction packet buffer at which a corresponding transaction packet is stored; and
wherein the control logic comprises a read pointer indicating an address buffer entry for a next transaction packet to be transmitted, a write pointer indicating an address buffer entry for a next transaction packet to be added to the buffer, and a last acknowledged sequence number pointer indicating an address buffer entry for the transaction packet having a sequence number for which an acknowledgment of receipt from the packet destination was last received.

12. A method of providing output buffering and speed matching for an interconnect apparatus, the method comprising:

writing sequentially transaction layer packets for transmission to a transaction layer packet buffer and transmitting the buffered transaction packets in sequence to a destination;

on receipt of a control packet indicative of non-receipt by the destination of a transmitted transaction layer packet, retransmitting the non-received transaction packet and transaction layer packets transmitted from the transaction layer packet buffer subsequent to the non-received transaction packet;

in response to the absence of a control packet indicative of non-receipt by the destination of a transmitted transaction packet within a predetermined period, retransmitting the transaction packets transmitted from the transaction packet buffer subsequent to a transaction packet for which an acknowledgment of receipt from the packet destination was last received;

wherein the interconnect apparatus comprises an address buffer, each entry in the address buffer identifying a location in the transaction packet buffer at which a corresponding transaction packet is stored; and wherein the interconnect apparatus comprises a read pointer indicating an address buffer entry for a next transaction packet to be transmitted, a write pointer indicating an address buffer entry for a next transaction packet to be added to the buffer, and a last acknowledged sequence number pointer indicating an address buffer entry for the transaction packet having a sequence number for which an acknowledgment of receipt from the packet destination was last received.

* * * * *

UNITED STATES PATENT AND TRADEMARK OFFICE
CERTIFICATE OF CORRECTION

PATENT NO. : 7,424,565 B2  
APPLICATION NO. : 11/280148  
DATED : September 9, 2008  
INVENTOR(S) : Magne Vigulf Sandven It is certified that error appears in the above-identified patent and that said Letters Patent is hereby corrected as shown below:

In claim 1 (at column 15, line 49), please replace the word, "farther" to --further--.

Signed and Sealed this

Eleventh Day of November, 2008

JON W. DUDAS  
*Director of the United States Patent and Trademark Office*